March 8, 1932.  H. H. FRAHM ET AL  1,848,944
MUD SCRAPER FOR TRACTOR WHEELS
Filed March 8, 1930  2 Sheets-Sheet 1
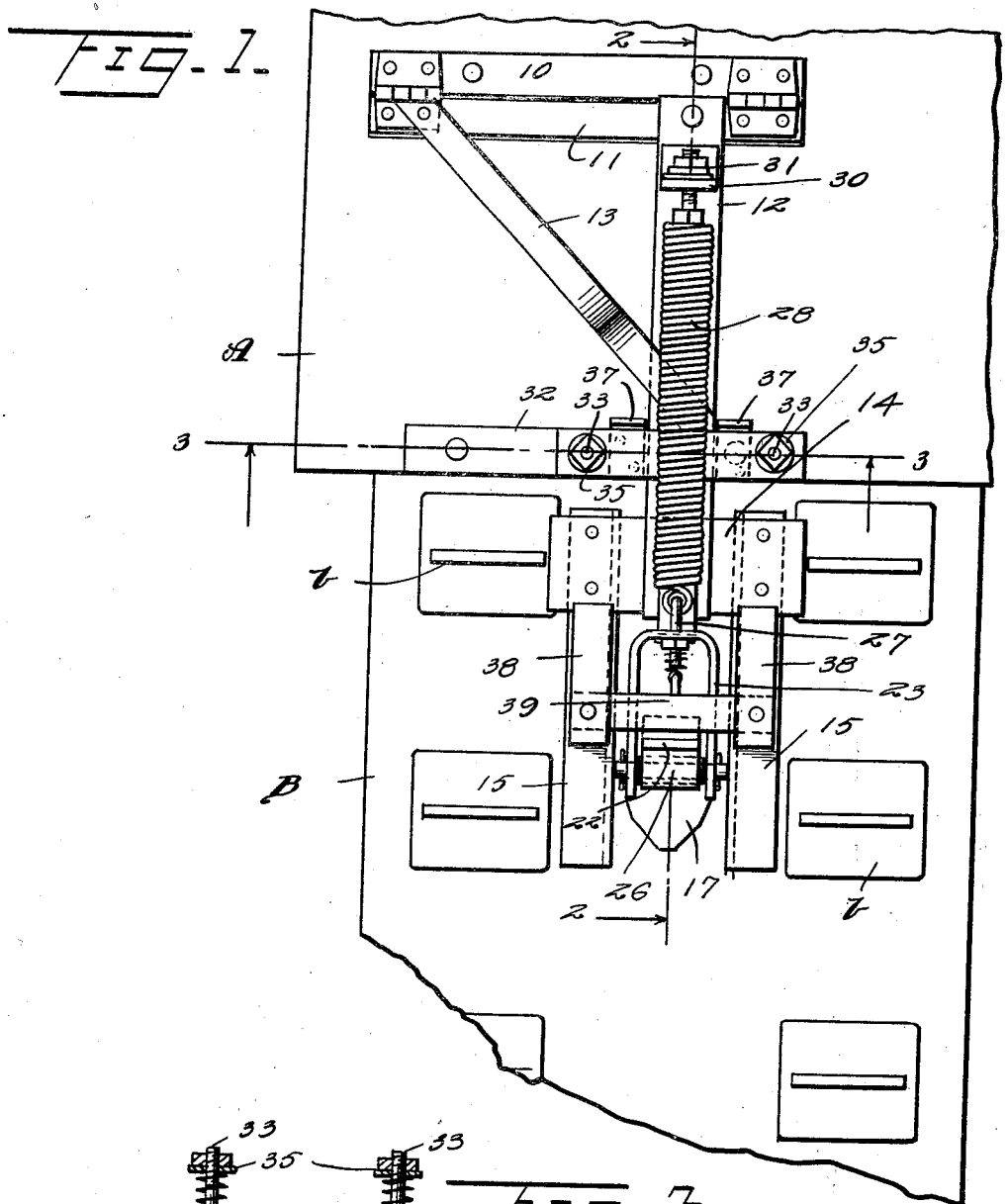
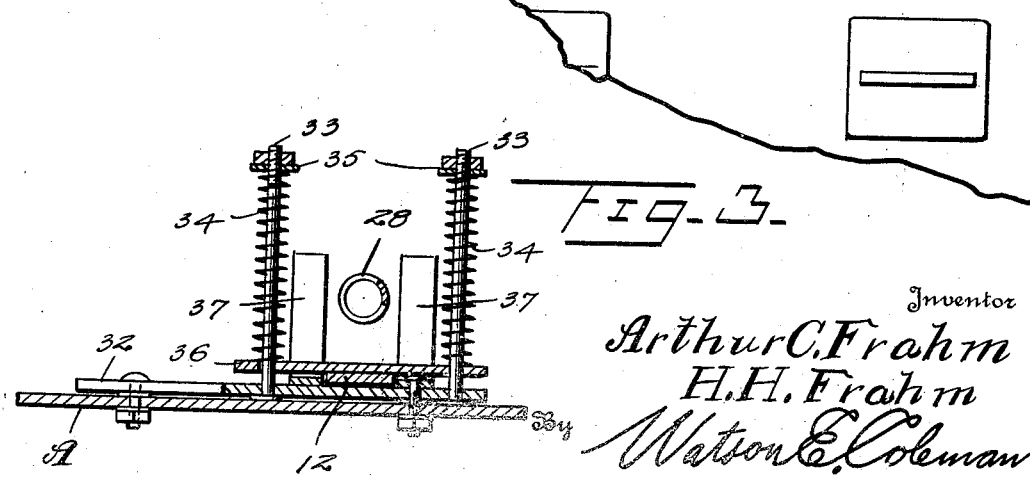
Inventor
Arthur C. Frahm
H. H. Frahm
By Watson E. Coleman
Attorney March 8, 1932.  H. H. FRAHM ET AL  1,848,944
MUD SCRAPER FOR TRACTOR WHEELS
Filed March 8, 1930    2 Sheets-Sheet 2
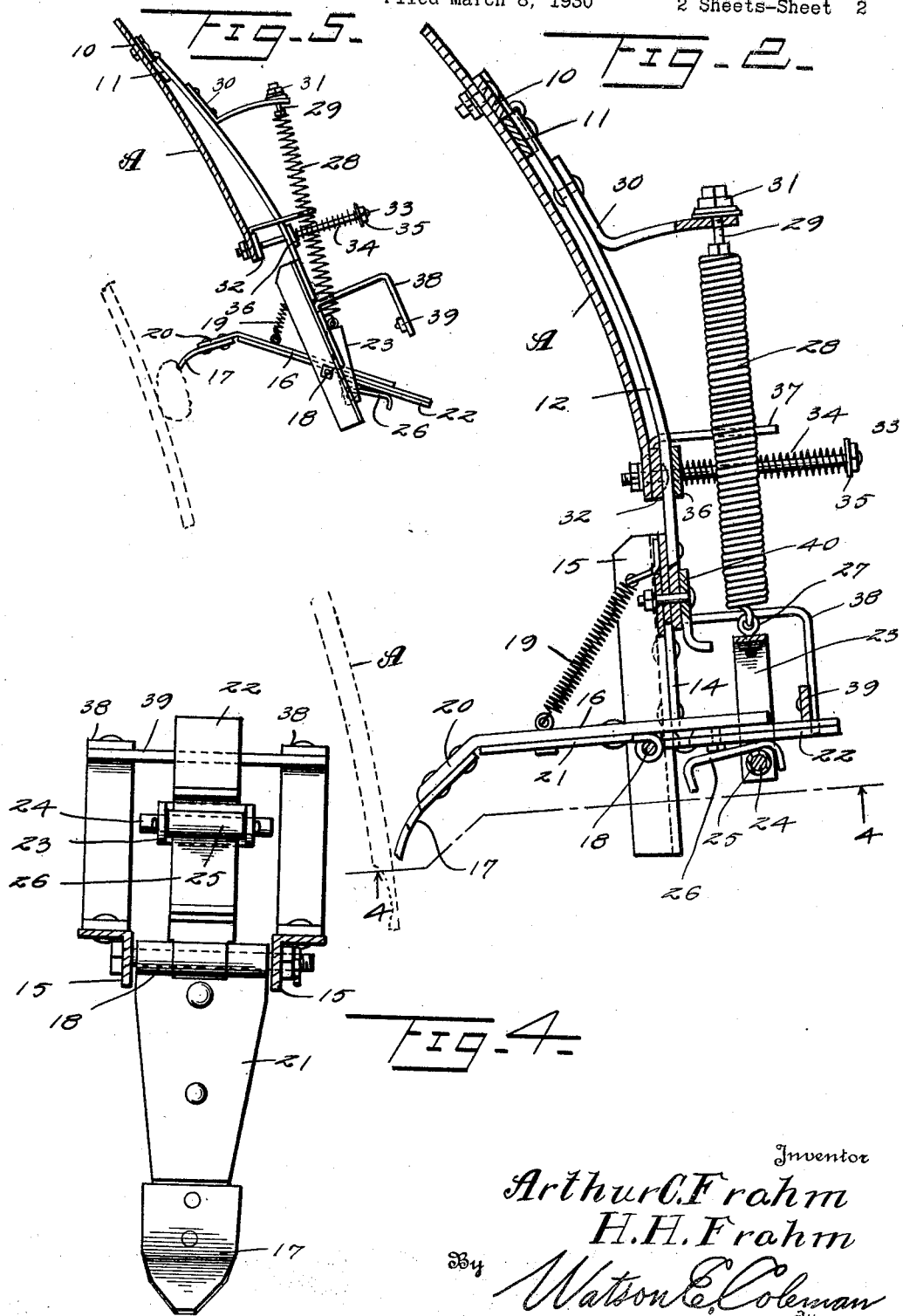
Inventor
Arthur C. Frahm
H. H. Frahm
By Watson E. Coleman
Attorney Patented Mar. 8, 1932

1,848,944

UNITED STATES PATENT OFFICE

HERMAN HENRY FRAHM AND ARTHUR CARL FRAHM, OF ELMA, IOWA

MUD SCRAPER FOR TRACTOR WHEELS

Application filed March 8, 1930. Serial No. 434,362.

This invention relates to means for scraping mud from tractor wheels and particularly to a scraper designed to work between two series of traction wheel lugs.

One of the objects of the present invention is to provide a scraper adapted to be mounted on the fender of a tractor wheel and which is so constructed that it will trip in case a stone or other obstruction is picked up by the wheel, and a further object is to provide a device of this character which will not, under these circumstances, cause undue strain on the fender.

A further object is to provide a scraper which will trip on meeting an obstruction in case the wheel moves reversely.

A further object is to yieldingly mount the scraper upon the fender so that when the scraper meets an obstruction, it will swing outward as well as move to tripping position.

Another object is to so connect the spring holding the scraper in its working position that when the scraper is tripped against the action of the spring, the spring will exert no greater tension on the scraper than the tension exerted before the spring is tripped.

Other objects will appear in the course of the following description.

Our invention is illustrated in the accompanying drawings, wherein:—

Figure 1 is an elevation of a portion of a fender and a traction wheel showing our scraper applied thereto;

Figure 2 is a section on the line 2—2 of Figure 1;

Figure 3 is a section on the line 3—3 of Figure 1;

Figure 4 is an under side plan view of the scraper itself, the supporting angle irons being shown in section;

Figure 5 is a like view to Figure 2, but on a smaller scale and showing the manner in which the scraper trips when striking a rock.

Referring to these drawings, A designates the fender and B a portion of the traction wheel having the lugs $b$ laterally spaced from each other. The scraper is hingedly mounted upon the fender A by the provision of a bar 10 which is bolted to the fender and to which a cross bar 11 is hinged. Extending downward from this cross bar 11 and rigidly bolted thereto is a supporting bar 12 braced by a diagonal brace 13 attached to the bar 11 and to the bar 12. Riveted, bolted or otherwise rigidly attached to the lower end of the bar 12 is a plate 14 and rearward of this plate are the downwardly extending spaced angle irons 15. Between these angle irons, the shank 16 of the scraping blade 17 is disposed. The shank 16 is oscillatably mounted upon the transverse bolt or pin 18 which extends through the angle irons 15. A spring 19 urges the scraper shank upward to the position shown in Figure 2.

The scraper shank is angled at its extremity as at 20 and the scraper 17 is riveted or otherwise attached to this angular portion and extends downward toward, but does not touch the wheel A. Thus there is no wear upon the extremity of the scraping blade 17. The hinged connection for the shank 16 to the pin 18 is formed by the hinge plate 21 which is riveted or bolted to the shank 16 and which is bent around the pintle 18.

Also hinged upon the pintle 18 is the shank section 22 which is overlapped by the rear end of the shank section 16. Embracing the shank section 22 is the stirrup 23 U-shaped in form and having the lower end of its legs connected by a transverse pin 24 surrounding which is a roller 25. Disposed between the under face of the shank section 22 and this roller 25 is a slidable U-shaped strip 26. The yoke or stirrup 23 is connected by an eye bolt 27 to a powerful, coiled contractile spring 28. The upper end of this spring is engaged by a bolt 29 passing through a bracket 30 attached to the bar 12 adjacent its upper end. A nut 31 engages the bolt 29 so that by this means the tension of the spring may be adjusted. As before remarked, this spring 28 is relatively powerful and holds the scraper in its scraping position.

Attached to the fender is a transverse bar 32 and passing through this bar on each side of the bar 12 and spring 28 are the outwardly projecting bolts 33. Coiled compression springs 34 surround these bolts and bear against washers 35 at the outer ends of the bolts and against a transverse plate 36 which in turn bears against the longitudinal bar 12. Riveted to the bar 32 are angular irons 37 which extend outward one on each side of the spring 28 and act to support the bar 12 from any lateral strain. The members 37 are attached to the bar 32 because this bar has a more rigid support than could be given to the hinge connection between the bar 10 and the bar 12.

Riveted to the angle irons 15 are two U-shaped frame bars 38 one leg of each bar being riveted to the angle irons 15 and each bar extending outward and then downward with a cross piece 39 riveted to the downwardly extending outer leg, thus constituting a stop for the extension 22 of the shank 16. Attached to the lower end of the longitudinal bar 12 is an angular latch 40 which is disposed between the U-shaped irons 38.

It will be understood that under ordinary circumstances, the scraper extends inward toward the wheel A, but in spaced relation to the periphery thereof so that this scraper will act to scrape off any mud which may accumulate between the series of lugs, thus preventing the tractive power of the wheel from being reduced by the mud. The spring 28 will hold the scraper in the position shown in Figure 2 and this spring is strong enough so as to practically hold the scraper rigidly in place unless a stone or other obstruction should bridge between the lugs on the traction wheel and move upward into engagement with the scraper. If this occurs, the scraper will move to the position shown in Figure 5. This pressure on the scraper will cause the scraper and the bar 12 upon which it is mounted to swing outward as shown in Figure 5 against the action of the springs 34, while the scraper tilts upward to permit the obstruction to pass. It is to be noted from Figure 5 that the roller 25 will bear against the lower face of the iron 26 and will roll from the rear end of this iron to the forward end thereof so that the spring will practically exert no more tension in the position shown in Figure 5 than it will in Figure 2. In other words, as the scraper is moving upward by the stone or other obstruction, the spring will not be placed under much greater tension than it was before and inasmuch as the scraper supporting frame including the bar 12 will swing upward upon the hinges 10a, there is very little strain placed upon the fender.

If the traction wheels are moving in the reverse direction and some obstruction carried by the wheels strikes the scraper, it will turn the section 16 downward upon the pintle 18. Under these circumstances, however, the yoke 23 cannot rise because it bears against the shank section 22, which in turn bears against the stop bar 39. This downward movement of the shank section 16 and of the scraper will be resisted by the relatively light coil spring 19. Thus the scraper will trip in whichever direction the traction wheels are rotating. The fact that this scraper operates against the action of a spring and that the supporting frame of the scraper lifts from the tractor fenders while the scraper is being tripped to let any obstruction pass, makes the scraper almost unbreakable.

When it is not necessary or desirable to use the scraper, it can be turned upon the hinge pin 18 and then the latch 40 which is rotatably mounted upon its bolt may be turned down over the end of the scraper shank 16, thus holding the scraper from contact with the wheel. This device cleans the middle portion of a tractor wheel and between the lugs and, of course, it is not adapted for use where the tractor wheel is provided with mud lugs extending the full width of the wheel. We have found in practice, however, that if the middle of the tractor wheel is kept clean, the dirt has a tendency to work toward the middle, thereby leaving the wheel practically clean. This will leave no ruts in the field when working on loose ground and secures at the same time the full tractive force of the wheel.

We claim:—

1. The combination with a tractor wheel and a fender therefor, of a scraper comprising a supporting frame hinged to the fender for outward swinging movement away from the traction wheel, springs on the fender yieldingly resisting outward movement of the frame, a scraper blade, a blade carrying shank pivoted upon the frame for movement in a vertical plane and extending beyond this pivotal axis, a shank section mounted upon the same pivotal axis and disposed beneath the rearwardly projecting portion of the blade shank, a stop limiting the upward movement of the free end of the shank section, and a coiled contractile spring carried upon the frame and operatively engaging the shank section to urge it upward against the stop and against the rearwardly projecting portion of the shank to thereby hold the blade to its work, and a spring attached to the frame and to the shank and yieldingly resisting downward movement of the blade shank and blade.

2. The combination with a tractor wheel and a fender therefor, of a scraper comprising a supporting frame hinged to the fender for outward swinging movement away from the traction wheel, springs on the fender yieldingly resisting outward movement of the frame, a scraper blade, a blade carrying shank pivoted upon the frame for movement in a vertical plane and extending beyond this pivotal axis, a shank section mounted upon the same pivotal axis and disposed beneath the rearwardly projecting portion of the blade shank, a stop limiting the upward movement of the free end of the shank section, a coiled contractile spring operatively mounted at one end upon the frame, a yoke carried by the other end of the spring and embracing the rearwardly projecting shank section, and a spring attached to the frame and to the shank and yieldingly resisting downward movement of the blade shank and blade.

3. The combination with a tractor wheel and a fender therefor, of a scraper coacting with the tractor wheel and including a frame bar hingedly mounted upon the exterior of the fender for outward swinging movement and extending below the fender, springs resisting outward movement of the frame bar, a supporting frame attached to the frame bar, a blade carrying shank hingedly mounted upon the supporting frame and carrying a scraper blade at one end and projecting outward beyond the pivotal axis of the shank at its other end, a coiled spring carried upon the frame and engaging the inner portion of the shank, a shank section hinged upon the pivotal axis of the blade shank and extending outward therefrom and against which the outwardly projecting end of the blade shank normally rests, a stop carried by the frame and against which said section bears, a bracket mounted upon the vertically extending frame bar, a coiled contractile spring engaged with said bracket, a yoke engaged with the lower end of the spring and embracing the shank section, a roller mounted upon the yoke and a U-shaped iron disposed between the lower face and the inner face of the shank section whereby to permit the yoke and spring to shift inward if the scraper blade is lifted against the action of the last named spring.

4. The combination with a tractor wheel and a fender therefor, tractor wheel cleaning means including a downwardly extending frame bar hingedly connected to the exterior face of the fender and adapted to swing outward therefrom and projecting below the fender, a cross bar extending over the frame bar, springs mounted upon the fender and bearing against the cross bar and resisting outward movement of the frame bar, guides mounted on the fender on each side of the frame bar, a supporting frame mounted upon the lower end of the frame bar and including downwardly extending spaced angle irons, a pintle connecting said angle irons, a blade carrying shank mounted upon said pintle and extending outward beyond the same, a shank section also pivoted upon said pintle and extending upward beneath the blade shank and normally supporting the same, a stop mounted upon the supporting frame and engaging the outer end of the shank section, a bracket mounted upon the frame bar, a coiled contractile spring extending downward between said guides for the frame bar and having a yoke at its lower end embracing the shank section, a roller carried by the yoke below the shank section, a U-shaped iron disposed loosely between the roller and the shank section, and a contractile spring attached to said supporting frame at its upper end and attached to the blade shank at its lower end and urging the blade carrying end of the shank upward.

5. The combination with a tractor wheel and fender, of a scraper support hingedly attached to the fender, a scraper pivotally mounted on the lower end of the support for swinging movement in the plane of the tractor wheel and normally extending toward the wheel, the scraper being swingable up or down from its normal position, a spring normally holding the scraper in its normal position but yieldingly permitting the scraper to swing in one direction upon striking an obstacle on the wheel, the scraper being movable in the other direction independently of the spring, and a second spring yieldingly resisting movement of the scraper in the last named direction.

6. The combination with a tractor wheel and fender, of a scraper support hingedly attached to the fender and normally depending below the same, a scraper pivotally mounted on the lower end of the support for swinging movement in the plane of the tractor wheel and normally extending toward the wheel, the scraper being swingable up or down from its normal position, a spring mounted upon the fender and engaging the scraper support and urging the scraper support toward the fender but permitting the scraper support to swing outward under stress, a second spring mounted at one end upon the scraper support and at the other end operatively engaging the outer end of the scraper, said spring yieldingly permitting the inner end of the scraper to swing upward upon engagement with an obstacle on the wheel, the scraper being movable in the other direction independently of the spring, and a second spring yieldably resisting movement of the scraper in the last named direction.

7. The combination with a tractor wheel and a fender, of a scraper operatively supported on the fender, the scraper being pivoted intermediate its ends for movement in a vertical plane, a spring supported member against which the outer end of the scraper bears when the scraper is substantially perpendicular to the wheel rim, means limiting the upward movement of the spring supported member, the outer end of the scraper being movable upward independently of the spring supported member, a spring urging the wheel engaging end of the scraper upward and the outer end downward against the spring supported member whereby said scraper is normally supported in a position perpendicular to said wheel rim but may be shifted against the action of one or the other of said springs to permit the passage of a stone.

8. The combination with a tractor wheel and a fender, of a scraper support attached to the fender, a scraper pivoted intermediate its ends upon the support for movement in a vertical plane, a spring supported member against which the outer end of the scraper bears when the scraper is substantially perpendicular to the wheel rim, means limiting the upward movement of the spring supported member, the outer end of the scraper being movable upward independently of the spring supported member, a spring urging the wheel engaging end of the scraper upward and the outer end of the scraper downward whereby to permit the scraper to be shifted against the action of one or the other of said springs on coming in contact with a stone upon the movement of the wheel in either direction.

9. The combination with a tractor wheel and a fender, of a scraper support attached to the fender and extending below the same, a scraper pivoted on the support and extending normally in a position approximately perpendicular to the face of the tractor wheel whereby the scraper may move upward or downward, a spring on the frame operatively engaging and yieldingly holding the outer end of the scraper against downward movement and the spring on the frame operatively engaging and yieldingly holding the inner end of the scraper against downward movement, said springs acting to return the scraper to its normal operative position after the scraper has been shifted in either direction.

10. The combination with a tractor wheel, of a scraper mounted in proximity thereto, the scraper being pivoted intermediate its ends and extending normally perpendicular to the face of the tractor wheel whereby the scraper may move upward or downward, a spring yieldingly holding the outer end of the scraper against downward movement, and a spring yieldingly holding the inner end of the scraper against downward movement, said springs acting to return the scraper to its normal operative position after the scraper has been shifted in either direction.

In testimony whereof we hereunto affix our signatures.

HERMAN HENRY FRAHM.
ARTHUR CARL FRAHM.